(12) United States Patent
Boydstun, IV et al.

(10) Patent No.: US 6,171,036 B1
(45) Date of Patent: *Jan. 9, 2001

(54) ADJUSTABLE PLATFORM TIE-DOWN SYSTEM FOR VEHICLE TRANSPORTER

(75) Inventors: Robert D. Boydstun, IV, Clackamas; John T. Huey, Milwaukie; Todd Papasadero; Michael Pritchard, both of Portland, all of OR (US)

(73) Assignee: Boydstun Metal Works Inc., Portland, OR (US)

( * ) Notice: Under 35 U.S.C. 154(b), the term of this patent shall be extended for 0 days.

This patent is subject to a terminal disclaimer.

(21) Appl. No.: 09/193,307

(22) Filed: Nov. 17, 1998

(Under 37 CFR 1.47)

Related U.S. Application Data

(63) Continuation-in-part of application No. 08/801,188, filed on Feb. 18, 1997, now Pat. No. 5,836,730, which is a continuation-in-part of application No. 08/658,497, filed on Jun. 5, 1996, now Pat. No. 5,746,554.

(51) Int. Cl.$^7$ ........................................................ B60P 7/08
(52) U.S. Cl. ................................... 410/12; 410/7; 410/10; 410/19; 410/23
(58) Field of Search .............................. 410/4, 7–12, 19, 410/21–23, 103; 248/499

(56) References Cited

U.S. PATENT DOCUMENTS

| | | |
|---|---|---|
| 2,492,829 | 12/1949 | Baker . |
| 3,595,598 | 7/1971 | Nuzum . |
| 3,613,919 | 10/1971 | Ceepo . |
| 3,650,416 | 3/1972 | Bodenheimer . |
| 3,841,235 | 10/1974 | Wheeler et al. ..................... 410/12 |

(List continued on next page.)

FOREIGN PATENT DOCUMENTS 61-175134   8/1986   (JP) .

OTHER PUBLICATIONS

Photographs of Japanese tie–down systems for vehicle trnasporters (1994) 20 pages.

*Primary Examiner*—Stephen T. Gordon
(74) *Attorney, Agent, or Firm*—Chernoff, Vilhauer, McClung & Stenzel

(57) ABSTRACT

A tie-down system for a vehicle transporter comprises a tie-down apparatus for securing a vehicle to a longitudinally-extending elongate vehicle transporter, comprising a vehicle support assembly, including a front deck and further including a rear deck that is variably positionable with respect to said front deck. At least four variably positionable securement devices are associated with the vehicle support assembly and attachable to the vehicle. A respective flexible tension member portion is interconnected with a respective one of each of the four securement devices to enable nonuniform variations in relative positions of the securement devices, each tension member portion capable of exerting a pull-down force on a respective one of the securement devices. A tension-applying mechanism is interconnected with each tension member portion to adjust the pull-down force on each of the securement devices and a tension-equalizing mechanism, interconnected with each tension member portion, capable of automatically distributing tension applied by the tension-applying mechanism among each tension member portion so as to substantially equalize said pull-down force automatically with respect to the four securement devices despite nonuniform variations in the relative positions of the securement devices, the tension-equalizing mechanism further capable of maintaining the substantially equalized pull-down force during and after adjustments of the relative positions of the front deck and the rear deck.

10 Claims, 4 Drawing Sheets

U.S. PATENT DOCUMENTS

| | | |
|---|---|---|
| 3,931,895 | 1/1976 | Grimaldo . |
| 4,068,813 | 1/1978 | Chatwin et al. . |
| 4,147,113 | 4/1979 | Kilgus et al. . |
| 4,316,686 | 2/1982 | Cottrell et al. .......................... 410/12 |
| 4,668,141 | 5/1987 | Petersen ................................ 410/12 |
| 4,668,142 | 5/1987 | Fity et al. ............................... 410/26 |
| 4,789,281 | 12/1988 | Westerdale ......................... 410/29.1 |
| 4,993,898 | 2/1991 | Klahold ................................. 410/12 |
| 5,071,298 | 12/1991 | Conzett ................................. 410/27 |
| 5,286,149 | 2/1994 | Seay et al. ............................. 410/26 |
| 5,746,554 | 5/1998 | Boydstun et al. ..................... 410/12 |
| 5,836,730 | 11/1998 | Boydstun et al. ..................... 410/12 |

ADJUSTABLE PLATFORM TIE-DOWN SYSTEM FOR VEHICLE TRANSPORTER

This application is a continuation-in-part of application Ser. No. 08/801,188 filed Feb. 18, 1997 now U.S. Pat. No. 5,836,730, which is a continuation-in-part of application Ser. No. 08/658,497 filed Jun. 5, 1996 and now U.S. Pat. No. 5,746,554.

BACKGROUND OF THE INVENTION

The present invention relates to vehicle transporters, such as trucks, trailers, railcars and the like, which have a tie-down apparatus for securing a vehicle to the vehicle transporter.

Application Ser. No. 08/801,188 filed Feb. 18, 1997 is assigned to the assignee of the present application and is hereby incorporated by reference as if fully set forth herein. Application Ser. No. 08/801,188 describes a tie-down system for a vehicle transporter that automatically equalizes the pull-down forces at all four points of securement of the vehicle, that allows the tension in the cables securing the vehicle to be adjusted simultaneously from one side of the vehicle transporter, that limits to a predetermined amount the pull-down force which may be applied to secure a vehicle, which does not cause deformation or wear of the cable due to repeated windings around a winch, and which does not require additional devices to longitudinally secure a vehicle regardless of its length. This application represents a significant advancement over the prior art. The embodiments shown, however, are not directly usable in conjunction with vehicle platforms which include a front deck and a rear deck and are longitudinally extensible or articulated for changing the angle at which a vehicle is retained. Even if adapted to be used with such a platform the tie-down system would have to be readjusted each time the length of the platform was changed.

What is, therefore, needed but not yet available is a vehicle tie-down system for use with an adjustable vehicle platform, wherein the vehicle platform may be adjusted without altering the tension of the vehicle tie-down system.

SUMMARY OF THE INVENTION

The present invention overcomes the aforementioned drawbacks of the prior art by providing an improved tie-down system to secure a vehicle to a longitudinally extending elongate vehicle transporter.

In a first aspect, the present invention comprises a tie-down apparatus for securing a vehicle to a longitudinally-extending elongate vehicle transporter, comprising a vehicle support assembly, including a front deck and further including a rear deck that is variably positionable with respect to said front deck. At least four variably positionable securement devices are associated with the vehicle support assembly and attachable to the vehicle. A respective flexible tension member portion is interconnected with a respective one of each of the four securement devices, each tension member portion capable of exerting a pull-down force on a respective one of the securement devices. A tension-applying mechanism is interconnected with each tension member portion to adjust the pull-down force on each of the securement devices. Additionally, a tension-equalizing mechanism is interconnected with each tension member portion and is capable of automatically distributing tension applied by the tension-applying mechanism among each tension member portion so as to substantially equalize said pull-down force automatically with respect to the four securement devices. Finally, the tension-equalizing mechanism is further capable of maintaining the substantially equalized pull-down force during adjustments of the relative positions of the front deck and the rear deck.

This first aspect of the present invention has the following advantage over the prior art. Because the length of the vehicle support assembly may be adjusted without disturbing the tension applied to the securement devices, support assemblies may be repositioned over a broader range relative to each other after some of the vehicles have been loaded, permitting greater flexibility in the loading process.

In a second separate aspect, the present invention comprises a tie-down apparatus for securing a vehicle to a longitudinally-extending elongate vehicle transporter, comprising a vehicle support assembly, is including a front deck and further including a rear deck that is variably positionable with respect to said front deck. At least four variably positionable securement devices are associated with the vehicle support assembly and attachable to the vehicle. A respective flexible tension member portion is interconnected with a respective one of each of the four securement devices, each tension member portion capable of exerting a pull-down force on a respective one of the securement devices. A tension-applying mechanism is interconnected with each tension member portion to adjust the pull-down force on each of the securement devices. Additionally, a tension-equalizing mechanism, interconnected with each tension member portion is capable of automatically distributing tension applied by the tension-applying mechanism among each tension member portion so as to substantially equalize said pull-down force automatically with respect to the four securement devices. Further, the tension-applying mechanism is capable of simultaneously adjusting said pull-down force on both said securement devices secured to said front deck and said securement devices secured to said rear deck.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 4 is a side view of the tie-down apparatus of FIG. 1, in its extended state.

FIG. 5 is a side view of the tie-down apparatus of FIG. 1, in its contracted state.

FIG. 6 is a schematic view of the tie-down apparatus of FIG.1.

FIG. 8 is a side view of the tie-down apparatus of FIG. 7.

DETAILED DESCRIPTION OF THE PREFERRED EMBODIMENT

The present invention can be incorporated into many alternative configurations of vehicle transporters, having diverse arrangements of vehicle support members as shown, for example, in U.S. Pat. Nos. 2,492,829, 3,650,416, 3,931, 895, 4,668,141, 4,668,142, 4,789,281, 5,071,298, 5,286,149 and 5,746,554 all of which are incorporated herein by reference. Any alternative configuration capable of being modified advantageously to incorporate the principles of the present invention, as so modified, is intended to be within the scope of the present invention.

Referring to FIGS. 1–6 a vehicle support assembly 16 is equipped with a tie-down apparatus 40. The vehicle support assembly 16 has a front deck 42 and a rear deck 44, that are slidingly engaged with each other so that the length of support assembly 16 may be changed. Both, front deck 42 and rear deck 44 include two wheel supporting ramps 42*a*, 42*b* and 44*a*, 44*b*, respectively. The transported vehicles are usually loaded onto the vehicle support assembly by driving the vehicles onto the ramps.

Figure 1:
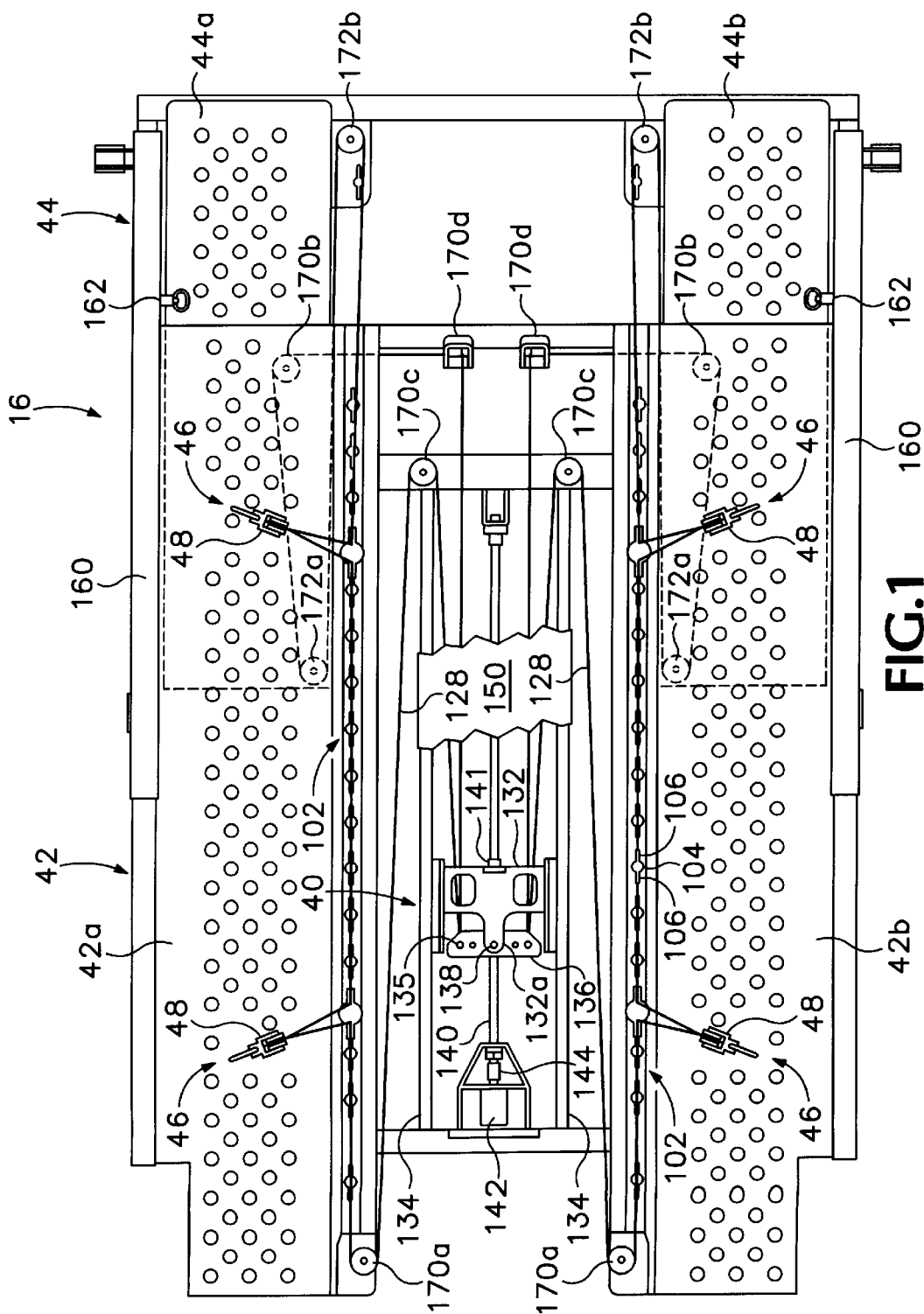
FIG. 1 is a top view of an exemplary tie-down apparatus, in its contracted state.
Figure 2:
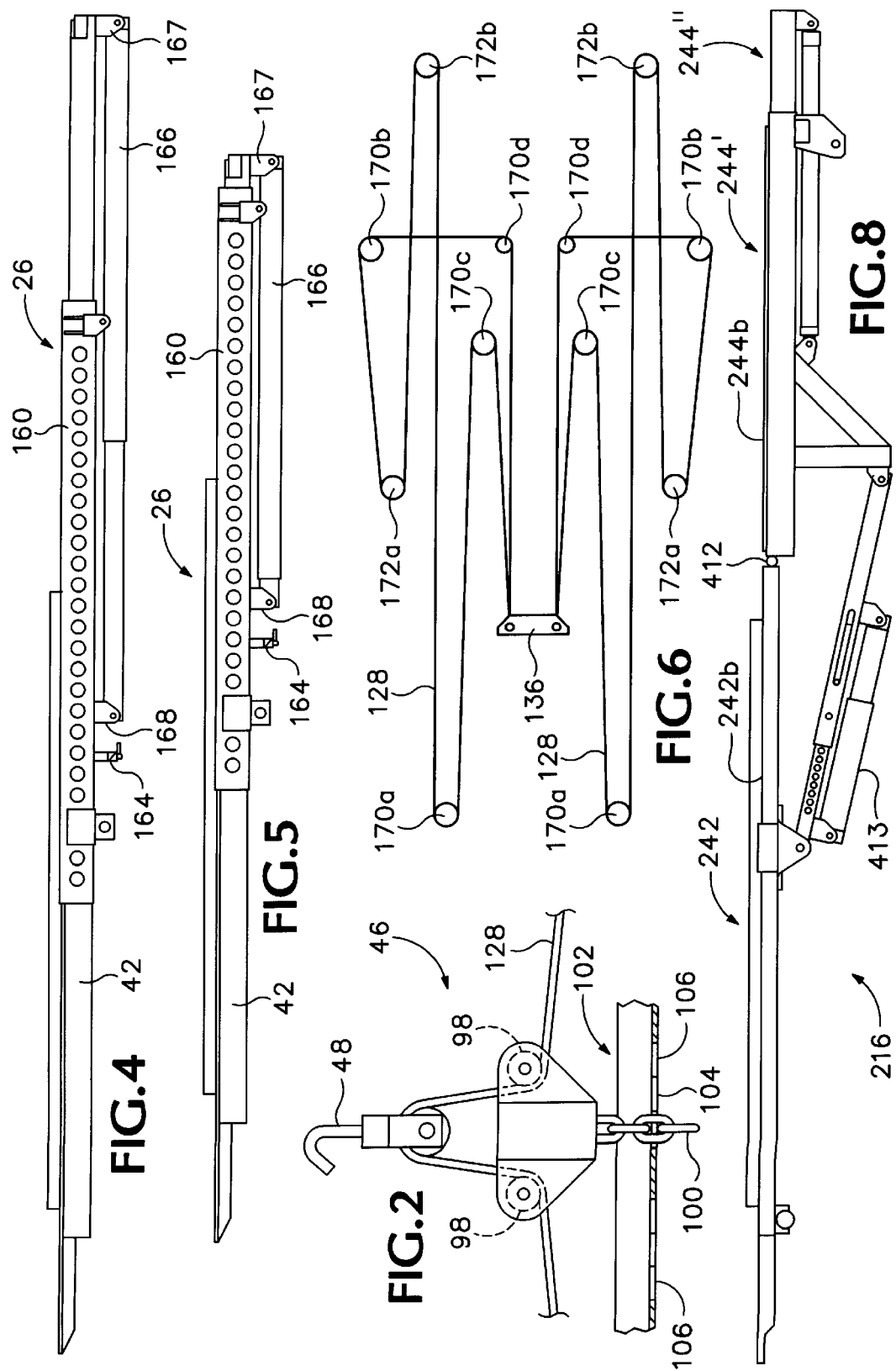
FIG. 2 is a detail view of a movable fastener utilized in the apparatus of FIG. 1
Figure 3:
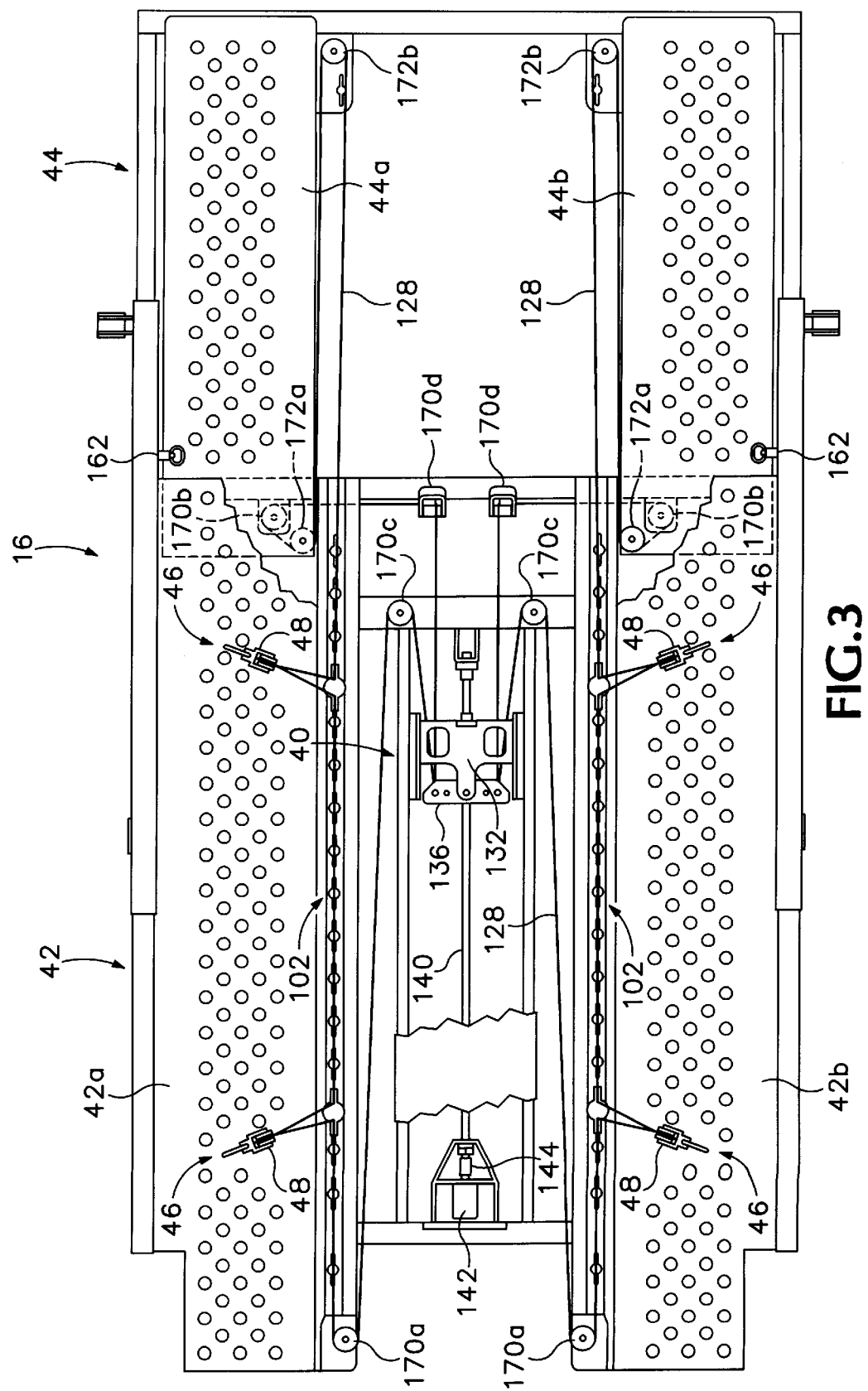
FIG. 3 is a top view of the tie-down apparatus of FIG. 1, in its extended state.

Four moveable fasteners 46 are associated with the vehicle support assembly 16. Each moveable fastener 46 includes a securement device 48, respectively, that is attachable to a vehicle. FIG. 2 shows a side view of an exemplary moveable fastener 46 which has two pulleys 98 which engage the tension member 128. Attached to the bottom of the movable fastener 46 are chain links 100. The vehicle support assembly 16 has a row of longitudinally-spaced keyholes 102 on each opposite side. The chain links 100 fit into the center hole 104 of the key-hole 102. At least one chain link 100 is then placed below the narrow slot 106 to prevent the movable fastener 46 from moving with respect to the vehicle support assembly 16. The securement device 48 is attached to the vehicle and a keyhole 102 is selected so that the longitudinal inclination of the pull-down force pulls the chain link away from the center hole 104.

Manufacturers of various types of vehicles provide specifications for the particular type of securement devices that should be used and where such securement devices should be attached. The manufacturers of the vehicles typically provide holes or loops on the body of the vehicle for attachment of the securement devices. This allows for securement of the vehicles independently of securement of the wheels of the vehicle.

The securement devices 48 are preferably attached to the body of the vehicle with one of securement devices 48 attached adjacent each of the four corners of the vehicle.

Each longitudinally-spaced pair of securement devices, 46 on the other side, is interconnected by one of tension members 128, each of which is preferably a cable. Both ends of each tension member 128 engage a pin 135 of a rocking beam assembly 136 that is pivotally attached to a moving carriage 132 by a pivot pin 138 on a clevis 132*a* which is part of the carriage 132. The carriage 132 is slidably mounted on two parallel tubes 134 on the vehicle support assembly 16 and is selectively movable longitudinally with respect thereto by means of a reversible screw member 140 threaded through a nut 141 affixed to the carriage 132. The screw member 140 is selectively driven bidirectionally by a rotary hydraulic motor 142, preferably acting through an adjustable torque-limiting coupling 144 which operates as a tension-limiting mechanism for the pull-down forces. A protective cover plate 150 is mounted atop the tubes 134.

A pair of brackets 160 maintain front deck 42 and rear deck 44 in sliding engagement with each other. A first set of pins 162 lock the front deck 42 to the rear deck 44, whereas a second set of pins 164 (FIGS. 5 and 6) lock the front deck to brackets 160. Prior to loading a vehicle onto vehicle support assembly 16, front deck 42 may be manually positioned by undoing pins 162 and 164, manually moving the front deck 42 relative to the brackets 160 and rear deck 42 and then relocking pins 162 and 164. This adjustment is generally in the nature of a coarse adjustment, to be rarely performed. More typically, either before or after the loading of a vehicle onto support assembly 16, front deck 42 and brackets 160 may be moved relative to rear deck 44 by undoing pins 162, and actuating a pair of hydraulic pistons 166, each secured between a rear deck clevis 167 and a bracket clevis 168, to either push front deck and brackets 160 forward or backwards. After this adjustment, pins 162 are locked again to prevent slippage.

An experienced vehicle loader may have a reasonable notion, after examining the collection of vehicles to be loaded onto a truck, of the optimal length and position of the various support assemblies 16. There are many instances, however, in which after loading a vehicle onto a first support assembly 16 it is discovered that it is necessary to shorten or lengthen the assembly 16 in order to fit another vehicle onto a second support assembly 16. Vehicle support assemblies, such as assembly 16, are typically positionable by a fairly extensive set of hydraulic actuators. After a vehicle is loaded, it can be positioned to determine the optimum position for optimal loading of the remaining vehicle support assemblies. During this process it may be determined that the length of the assembly 16 is not optimum and it may be desired to make an adjustment to this length without loosening the tie-down assembly 40. In addition, there are many instances in which it is desirable to lengthen a support assembly 16 for the purpose of vehicle loading, but it is desirable to shorten assembly 16 after the vehicle is loaded to, again, make room for other vehicles loaded onto other support assemblies. By facilitating the performance of this adjustment, the task of the person loading the vehicles is greatly eased.

Assembly 16 includes a mechanism (at 26) for permitting the above described length adjustment to be performed, after a car or truck has been fastened into place, yet retaining the same tension in tie-down apparatus 40. As shown particularly in FIG. 6, tension members 128 are wrapped about front deck front pulleys 170*a*, front deck rear pulleys 170*b*, front deck middle pulleys 170*c* and front deck pulley assemblies 170*d* on the front deck 42 and rear deck front pulleys 172*a* and rear deck rear pulleys 172*b* on the rear deck 44. When the vehicle support assembly 16 is shortened by sliding front deck 42 and rear deck 44 into greater engagement with each other, the distance between front deck front pulley 170*a* and rear deck rear pulley 172*b* decreases by the same amount that the distance between rear deck front pulley 172*a* and front deck rear pulley 170*b* increases. Accordingly, tension members 128 remain taught during and after the shortening of vehicle support assembly 16. Likewise when vehicle support assembly 16 is lengthened by sliding front deck 42 and rear deck 44 away from each other, the distance between front deck front pulley 170*a* and rear deck rear pulley 172*b* increases by the same amount that the distance between rear deck front pulley 172*a* and front deck rear pulley 170*b* decreases. This embodiment also permits a single motor 142 to effect the adjustment of the tension applied to all the securement devices 46 even though some securement devices 46 are connected to the front deck 42 and other securement devices 46 are connected to the rear deck 44.

Figure 7:
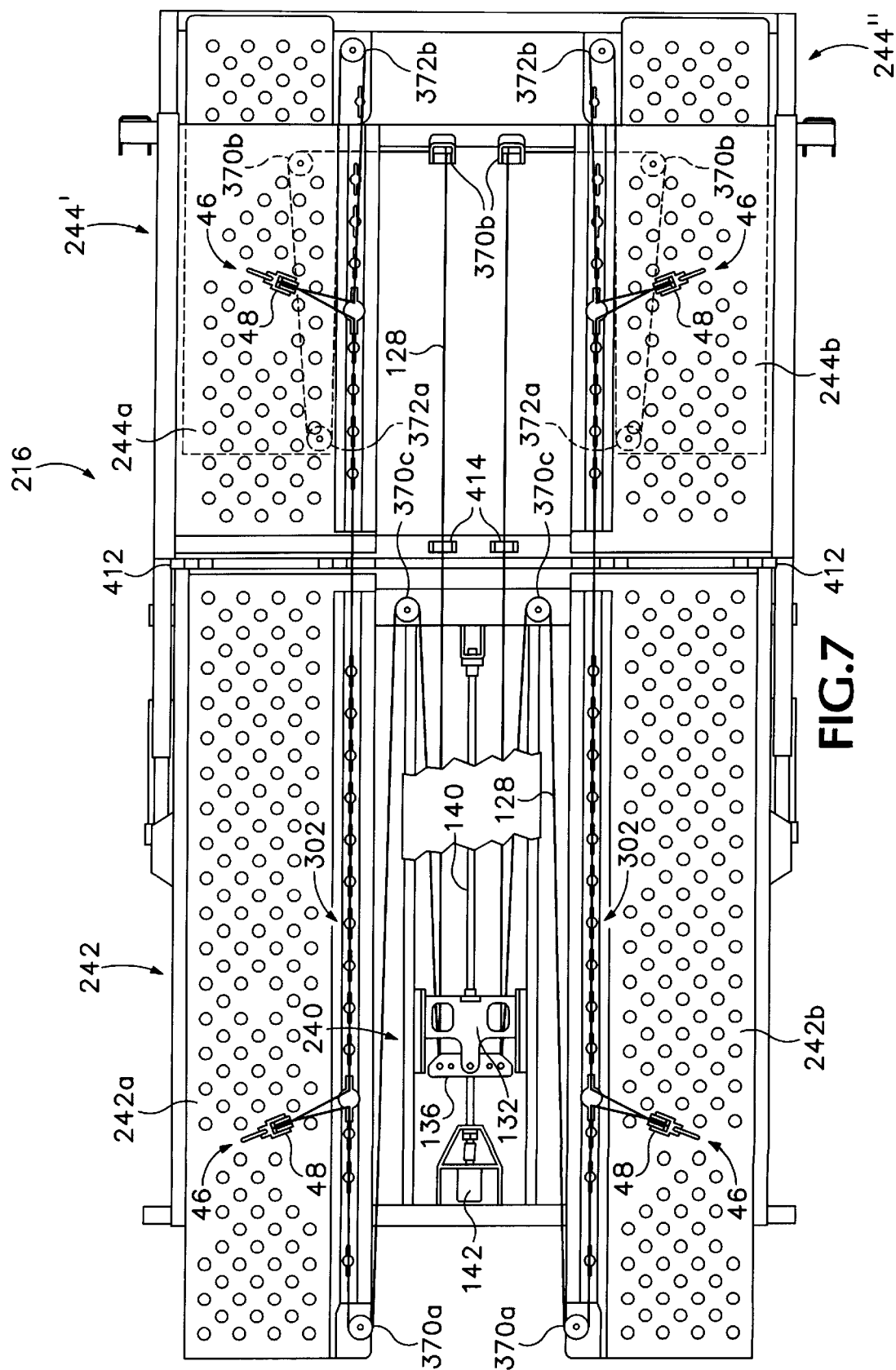
FIG. 7 is a top view of an alternative tie-down apparatus in accordance with the present invention.

An alternative preferred embodiment of a vehicle support assembly 216 is shown in FIGS. 7 and 8. Identical parts of FIGS. 7 and 8 are labeled with the same reference numbers used in FIGS. 1–6. Similar parts or groups of parts of FIGS. 7 and 8 are labeled with the same reference numbers used in FIGS. 1–6 plus 200. The distinguishing features of the alternative preferred embodiment include the fact that front deck 242 and rear deck 244 are connected by a hinge 412, rather than being slidingly engaged together as in the embodiment of FIGS. 1–6. Hydraulic actuator 413 acts to change the angle of articulation between decks 242 and 244. Changing the angle of articulation between front deck 242 and rear deck 244 will change the vertical angle of the vehicle loaded onto assembly 216, potentially permitting an additional vehicle to be loaded onto the truck or trailer. Further, rear Beck 244 is divided into a rear deck front portion 244' and a rear deck rear portion 244" that are slidingly engaged together and that, similar to decks 42 and 44, permit support assembly 216 to be adjusted in length without affecting the tension of tie-down system 240. Despite the articulation of front deck 242 with rear deck 244 the tension on all four securement devices may be adjusted by the single motor 142. Tension member guides 414 prevent tension member 128 from rubbing against the frame of support assembly 216 regardless of the articulation of front deck 42 and rear deck 44.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow. As used in this application the term "pulley" refers to any element that allows a rope, cable or other tension member to slide easily past. It is not limited to the familiar mounted wheel pulley.

What is claimed is:

1. A tie-down apparatus for securing a vehicle to a longitudinally-extending elongate vehicle transporter, comprising:
   (a) a vehicle support assembly, including a front deck and a rear deck, one of which is variably positionable with respect to the other;
   (b) at least four variably positionable securement devices associated with said front and rear decks and attachable to said vehicle;
   (c) a respective flexible tension member portion interconnected with a respective one of each of said four securement devices, each tension member portion capable of exerting a pull-down force on a respective one of said securement devices;
   (d) a tension-applying mechanism interconnected with each said tension member portion to adjust said pull-down force on each of said securement devices; and
   (e) a tension-equalizing mechanism, interconnected with each said tension member portion, capable of automatically distributing tension applied by said tension-applying mechanism among each said tension member portion so as to substantially equalize said pull-down force automatically with respect to said four securement devices, said tension-equalizing mechanism further capable of maintaining said substantially equalized pull-down force during adjustments of the relative positions of said front deck and said rear deck relative to each other.

2. The apparatus of claim 1 wherein said front deck and said rear deck are slidingly engaged with each other.

3. The apparatus of claim 1 wherein said front deck includes a front pulley and a rear pulley and said rear deck includes a front pulley and a rear pulley, said tension equalizing mechanism being interconnected with each said pulley and wherein said rear deck front pulley is in front of said front deck rear pulley and said front deck front pulley is located in front of said rear deck rear pulley so that when the position of said rear deck is changed in relation to the position of the front deck the distance between said rear deck front pulley and said front deck rear pulley and the distance between said front deck front pulley and rear deck rear pulley are changed by equal and opposite amounts, thereby maintaining said tension applied by said tension-equalizing mechanism.

4. The apparatus of claim 3 wherein said front deck and said rear deck further include additional pulleys adapted to transversely extend and balance said tension-equalizing mechanism.

5. The apparatus of claim 1, including a tension-limiting mechanism interconnected with said tension-applying mechanism and capable automatically of limiting each said pull-down force exerted by each respective tension member portion to a predetermined amount of force.

6. A tie-down apparatus for securing a vehicle to a longitudinally-extending elongate vehicle transporter, comprising:
   (a) a vehicle support assembly, including a front deck and a rear deck, one of which is variably positionable with respect to the other;
   (b) at least four variably positionable securement devices associated with said front and rear decks and attachable to said vehicle, at least some of said securement devices secured to said front deck and others of said securement devices secured to said rear deck;
   (c) a respective flexible tension member portion interconnected with a respective one of each of said four securement devices, each tension member portion capable of exerting a pull-down force on a respective one of said securement devices;
   (d) a tension-equalizing mechanism, interconnected with each said tension member portion, capable of automatically distributing tension applied by a tension-applying mechanism among each said tension member portion so as to substantially equalize said pull-down force automatically with respect to said four securement devices; and
   (e) said a tension-applying mechanism interconnected with each said tension member portion to adjust said pull-down force on each of said securement devices, said tension-applying mechanism capable of simultaneously adjusting said pull-down force on both said securement devices secured to said front deck and said securement devices secured to said rear deck.

7. The apparatus of claim 6 wherein said front deck and said rear deck are slidingly engaged with each other.

8. The apparatus of claim 6 wherein said front deck and said rear deck are hinged together.

9. The apparatus of claim 6, including a tension-limiting mechanism interconnected with said tension-applying mechanism and capable automatically of limiting each said pull-down force exerted by each respective tension member portion to a predetermined amount of force.

10. A tie-down apparatus for securing a vehicle to a longitudinally-extending elongate vehicle transporter, comprising:
   (a) a vehicle support assembly;
   (b) at least four variably positionable securement devices associated with said vehicle support assembly and attachable to said vehicle;

(c) a respective flexible tension member portion interconnected with a respective one of each of said four securement devices to enable nonuniform variations in relative positions of said securement devices, each tension member portion capable of exerting a pull-down force on a respective one of said securement devices;

(d) a tension-applying mechanism interconnected with each said tension member portion to adjust said pull-down force on each of said securement devices; and (e) a tension-equalizing mechanism, interconnected with each said tension member portion, capable of automatically distributing tension applied by said tension-applying mechanism among each said tension member portion so as to substantially equalize said pull-down force automatically with respect to said four securement devices despite nonuniform variations in the relative positions of said securement devices.

* * * * *

UNITED STATES PATENT AND TRADEMARK OFFICE
CERTIFICATE OF CORRECTION

PATENT NO. : 6,171,036 B1
DATED : January 9, 2001
INVENTOR(S) : Robert D. Boydstun IV. et al.

It is certified that error appears in the above-identified patent and that said Letters Patent is hereby corrected as shown below:

Column 2,
Line 16, change "assembly, is including" to -- assembly, including --.

Column 5,
Line 11, change "Beck" to -- deck --.

Column 6,
Line 45, change "said a tension-applying" to -- said tension-applying --.

Signed and Sealed this

Eleventh Day of December, 2001

*Attest:*

NICHOLAS P. GODICI
*Attesting Officer*    *Acting Director of the United States Patent and Trademark Office*